March 6, 1956 R. P. ALLAIRE ET AL 2,737,610

TUNABLE MAGNETRON CIRCUIT

Filed Nov. 16, 1945 2 Sheets-Sheet 1

INVENTORS
ROYAL P. ALLAIRE
ALBERT M. CLOGSTON
EDGAR EVERHART

By William D. Hall
ATTORNEY

March 6, 1956 R. P. ALLAIRE ET AL 2,737,610

TUNABLE MAGNETRON CIRCUIT

Filed Nov. 16, 1945 2 Sheets-Sheet 2

*INVENTORS*
ROYAL P. ALLAIRE
ALBERT M. CLOGSTON
EDGAR EVERHART

By William D. Hall.
ATTORNEY

United States Patent Office 2,737,610

Patented Mar. 6, 1956

2,737,610

TUNABLE MAGNETRON CIRCUIT

Royal P. Allaire, Cambridge, Albert M. Clogston, Melrose, and Edgar Everhart, Cambridge, Mass., assignors, by mesne assignments, to the United States of America as represented by the Secretary of War Application November 16, 1945, Serial No. 629,156

1 Claim. (Cl. 315—39)

This invention relates to electrical apparatus and more particularly to tunable magnetron radio frequency oscillators.

Various types of tunable magnetron R.-F. oscillators have been devised in the past. One common type has been the so-called "double output" magnetron. The double output magnetron has two R.-F. channels, one being the customary R.-F. output to the load, and the other being a tunable reactance channel.

Such double output magnetrons have in the past been characterized by a relatively small tuning range rarely exceeding 5%. The tuning range may be defined as the $$\frac{\Delta\lambda}{\lambda}(100)$$

where $\Delta\lambda$ is the wavelength difference between the extremes of the tuning adjustment and $\lambda$ is the center wavelength.

An important object of the present invention is to produce a tunable double output magnetron having a tuning range of the order of 10–12%, and running as high as 25% in certain cases.

A further object of the invention is to minimize the appearance of undesired modes of oscillation within the magnetron. The desired mode of oscillation within the magnetron is the pi-mode in which alternate anode vanes are positive and negative. The mode separation of a magnetron is the frequency difference between the frequency of the pi-mode and the frequency of the nearest undesired mode. In general the tuning range of double output magnetrons cannot exceed the mode separation for the particular magnetron in question.

Other objects and advantages of the invention will be apparent during the course of the following description.

In the accompanying drawings forming a part of this specification:

Figure 1:
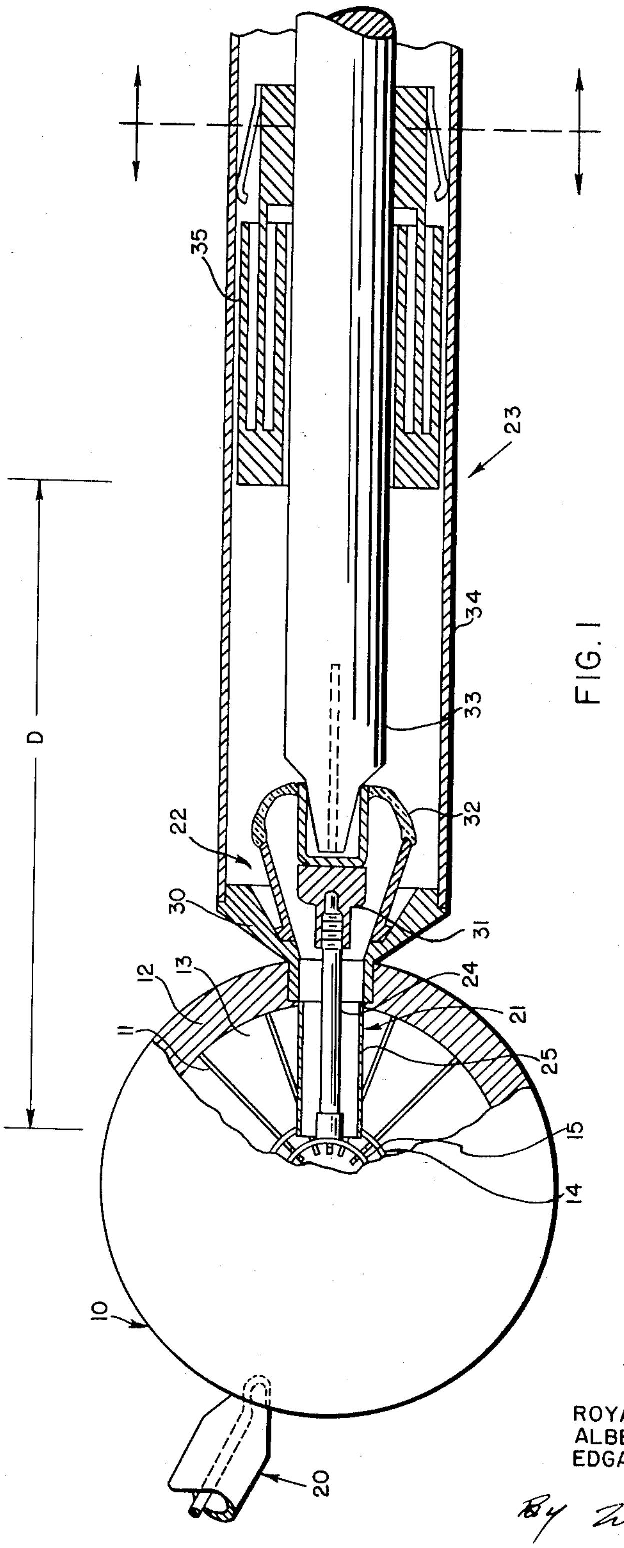
Fig. 1 is a simplified view of a double output magnetron embodying this invention. The shell of the magnetron in the neighborhood of the tuning reactance channel has been broken away to better illustrate the details of the coupling.

Referring to Fig. 1, the numeral 10 designates a plural cavity magnetron radio frequency oscillator of substantially cylindrical shape. Substantially equidistantly placed anode vanes or anode segments 11 extend radially outward and terminate on the outer wall structure 12. The anode vanes 11 and outer wall structure 12 of magnetron 10 define therebetween the various oscillator cavities 13. Alternate anode vanes 11 are joined at their inner terminations by circular straps 14 and 15. Thus alternate vanes are joined by strap 14 and intermediate alternate vanes are joined by strap 15. The inner terminations of anode vanes 11 (adjacent to strap 15) may be termed the inner open terminals. These terminals generally correspond to R.-F. high voltage points.

The numeral 20 designates the customary R.-F. output (to the load) coaxial transmission line which couples into one of the oscillator cavities of magnetron 10.

A cooperating tuning reactance channel comprises three sections: a substantially quarter wavelength section of relatively small diameter coaxial transmission line 21 (disposed within magnetron 10), a short vacuum-seal coaxial transmission line section 22, and a variable short-circuited coaxial transmission line tuning stub 23.

The relatively small diameter section of coaxial transmission line 21 is entirely within magnetron 10 and extends from a point between the two straps 14 and 15 approximately to the outer circumference of the magnetron 10. The inner conductor 24 of section 21 make electrical contact with the inner strap 15. The outer conductor 25 of section 21 makes electrical contact with the outer strap 14.

The short vauum-seal coaxial transmission line section 22 includes a tapered section of outer conductor 30 and an abrupt step-impedance type of inner conductor 31. The vacuum within the magnetron 10 is maintained by the glass seal 32. Outer conductor 30 is connected to conductor 25 of line 21, while inner conductor 31 is connected to conductor 24.

The variable coaxial transmission line tuning stub 23 includes an inner conductor 33 connected with inner conductor 31, and an outer conductor 34 connected with outer conductor 30. Tuning stubs 23 may be short-circuited at any desired point along the length thereof by means of the short-circuiting choke type plunger 35. The effective length D of the external tuning channel extends as shown substantially from a point between the straps 14 and 15 to the forward end of the movable plunger 35.

Figures 2, 3:
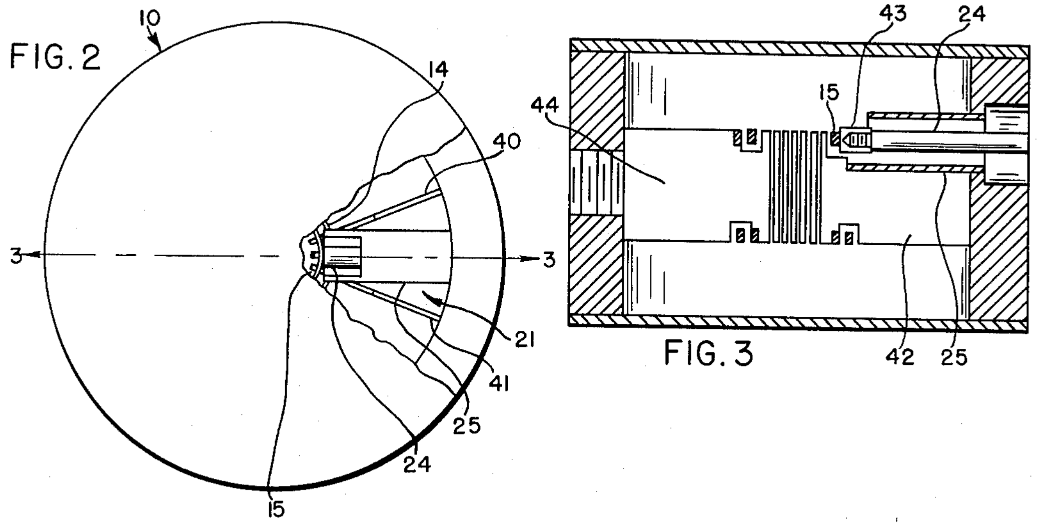
Fig. 2 is a simplified top view of the magnetron. The shell of the magnetron in the region of the tuning reactance channel has been broken away.
Fig. 3 is a cross-sectional view taken on the line 3—3 of Fig. 2.
Figure 2A:
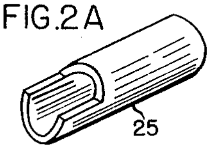
Fig. 2A is a view of the outer conductor of the coaxial line of Fig. 2.
Figure 2B:
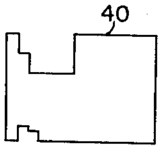
Fig. 2B is a view of the adjacent cut away anode vanes of Fig. 2.

Figs. 2, 2A, and 2B illustrate the manner of coupling coaxial line 21 to straps 14 and 15 in somewhat more detail. The numerals 40 and 41 represent anode vanes adjacent to coaxial line 21 and are shown in detail in Fig. 2B. The adjacent anode vanes 40 and 41 are cut away to provide clearance for the outer conductor 25 of coaxial line 21. The outer conductor 25 of coaxial line 21 is shown in detail in Fig. 2A. The top of outer conductor 25 is partially cut away to allow visual inspection when inner conductor 24 is assembled to make contact with inner strap 15.

Fig. 3 is a cross-sectional view of Fig. 2 taken on the line 3—3. Further details of the specific manner of coupling are illustrated in Fig. 3. The outer conductor 25 is soldered directly to the special anode vane 42 which supports the outer conductor 25 of coaxial line 21 and thereby makes contact with the outer strap 14 which is likewise connected to the special anode vane 42. An internally threaded stud 43 is soldered to the inner strap 15 at the point at which strap 15 is to make contact with inner conductor 24. Inner conductor 24 has a small threaded section at its end which is secured in threaded stud 43. The numeral 44 designates a conventional anode vane entirely equivalent to anode vane 11 (Fig. 1).

While the method of coupling the coaxial line 21 directly to the inner and outer straps 15 and 14 respectively has been described in detail, it is to be understood that this is merely one possible method of effecting this coupling. The inner conductor 24 and outer conductor 25 of coaxial line 21 could of course be soldered directly to straps 15 and 14 if desired.

Figure 4:
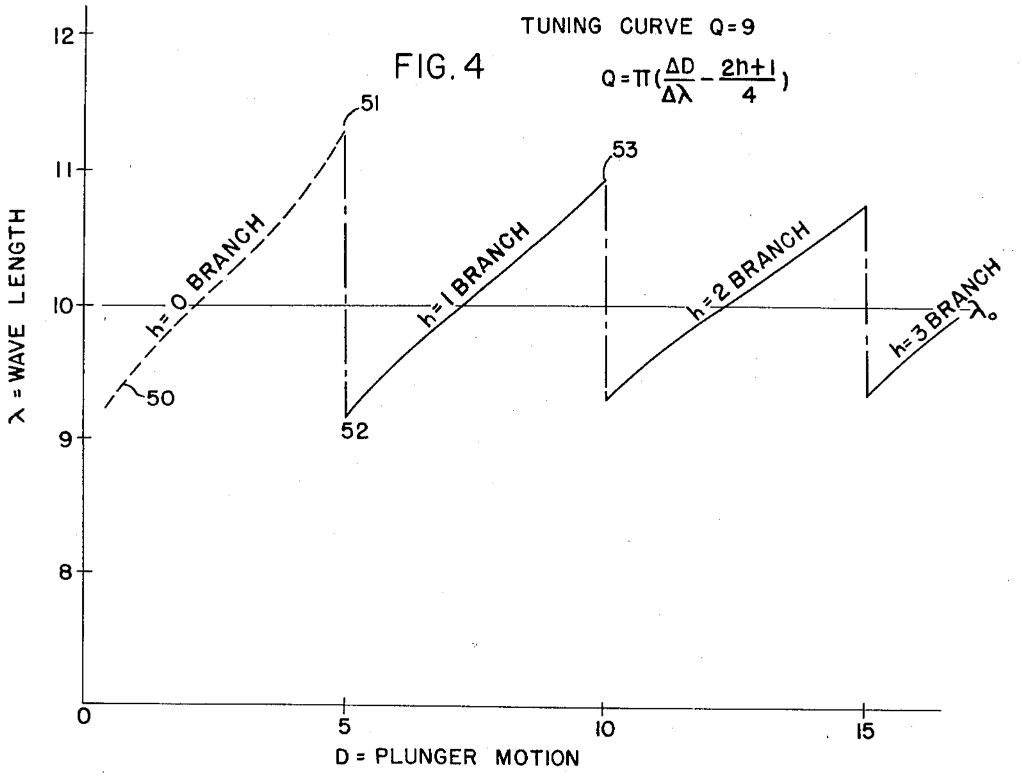
Fig. 4 is a tuning curve for the double output magnetron of Fig. 1 plotting wavelength $\lambda$ as ordinate versus plunger motion D as abscissa.

The operational features of the present invention will be described with particular reference to Fig. 4 and are as follows:

Fig. 4 is a tuning curve plotting wavelength $\lambda$ of the R.-F. output of magnetron 10 as ordinate versus motion D of tuning plunger 35 as abscissa for a particular design of the invention shown in Fig. 1.

Starting at the point marked 50, the tuning of the magnetron proceeds along the $n=0$ branch until some point 51 is reached at which point the operation changes abruptly to point 52 on the $n=1$ branch and proceeds thence to point 53 along said $n=1$ branch. This phenomenon occurs as a result of an interaction between two factors. One factor is the addition of a half wavelength to the tuning stub, and the other factor is present because of other conditions of resonance within the magnetron. The exact change-over point (i. e. 51—52) is not sharply defined and is a function of the plate current for a particular magnetron.

Referring again to the curves on Fig. 4, it is evident that the tuning range will in general increase when tuning plunger 35 is moved in a branch of lower $n$ number. Due to the geometry of the magnetron and associated coaxial lines 21, 22 and 23, it is not possible to tune in the $n=0$ branch with external tuning. However, tuning in the $n=1$ branch is possible due to the shortness of section 22. This section, it will be remembered, is characterized by a very short length, thus to permit the attainment of a correspondingly short distance D. Operation in the $n=1$ branch instead of the $n=2$ branch makes it possible to increase the output tuning range from approximately 8% to 12%.

In general it has been found that the existence of stray reactances in the tuning reactance channel is accompanied by a decrease in the tuning range. Stray inductance effects have been minimized by extending outer conductor 25 to within the space between outer strap 14 and inner strap 15, thereby shielding inner conductor 24 substantially to its point of contact with inner strap 15. Conductor 25 does not, however, contact inner strap 15.

We now define the "Q" factor by the following equation:

$$Q=\pi\left(\frac{\Delta D}{\Delta\lambda}-\frac{2n+1}{4}\right)$$

where $$\frac{\Delta D}{\Delta\lambda}$$

is the slope of the tuning curve of Fig. 4 at the magnetron center wavelength $\lambda_0$; and $n$ is the number of the tuning branch.

The degree of coupling between coaxial line 21 and magnetron 10 is related to this Q factor, a high Q factor being associated with loose coupling and low Q factor with tight coupling. Empirically it develops that a Q factor between 6 and 12 will give satisfactory results with respect to both power output and tuning range. For Q's much lower than this (i. e. too tight coupling), too much power is dissipated in the tuning reactance channel while for Q's higher than this range (i. e., too loose coupling), the tuning range is excessively decreased. The curves on Fig. 4 are drawn for a value of $Q=9$.

One method of varying the Q factor is to vary the characteristic impedance of the quarter wave section of coaxial transmission line 21. The Q factor increases with increasing characteristic impedance.

A tuning range of the order of 12% may be obtained by using a Q factor of 9 as shown for the tuning curves of Fig. 4. By decreasing the Q factor, thereby increasing the coupling, it is possible to attain a tuning range of the order of 25%, subject however to a somewhat decreased power output.

While there has been described what is at present considered to be the preferred embodiment of this invention, it will be obvious that various changes and modifications may be made therein without departing from the scope of the invention.

What is claimed is:

In a magnetron of the type having a plurality of radial anode vanes, one of said vanes being smaller in height than the remaining vanes, a coaxial transmission line having a diameter smaller than the height of said remaining vanes extending into said magnetron and conductively mounted on top of said smaller vane along its radial extent, and the two vanes adjacent said shorter vane each having a cut-out section along the top thereof near the end thereof toward the center of said magnetron, to allow the passage of said coaxial line.

References Cited in the file of this patent

UNITED STATES PATENTS

| | | |
|---|---|---|
| 2,233,482 | Linder | Mar. 4, 1941 |
| 2,356,414 | Linder | Aug. 22, 1944 |
| 2,373,233 | Dow et al. | Apr. 10, 1945 |
| 2,406,402 | Ring | Aug. 27, 1946 |
| 2,411,151 | Fisk | Nov. 19, 1946 |
| 2,413,385 | Schmidt | Dec. 31, 1946 |
| 2,414,085 | Hartman | Jan. 14, 1947 |
| 2,435,984 | Spencer | Feb. 17, 1948 |
| 2,477,317 | Spencer | July 26, 1949 |
| 2,530,172 | Okress | Nov. 14, 1950 |
| 2,591,976 | Stinchfield | Apr. 8, 1952 |